United States Patent [19]

Hanner

[11] 4,247,808

[45] Jan. 27, 1981

[54] METHOD AND APPARATUS FOR VARYING THE SPEED OF DC MOTORS

[76] Inventor: John C. Hanner, 407 Transylvania Ave., Raleigh, N.C. 27609

[21] Appl. No.: 868,520

[22] Filed: Jan. 11, 1978

[51] Int. Cl.³ .............................................. H02P 7/24
[52] U.S. Cl. ................................ 318/345 G; 318/346; 318/361; 318/439; 318/541
[58] Field of Search .................... 318/345 G, 346, 360, 318/361, 541, 519, 439; 310/136, 137, 151

[56] References Cited

U.S. PATENT DOCUMENTS

| | | | |
|---|---|---|---|
| 3,302,088 | 1/1967 | Wigington | 318/345 G |
| 3,437,898 | 4/1969 | Bates | 318/439 |
| 3,453,513 | 7/1969 | Bates et al. | 318/439 |
| 3,544,868 | 1/1968 | Bates | 318/439 |
| 3,940,644 | 2/1976 | Manz | 310/136 |

Primary Examiner—Gene Z. Rubinson
Assistant Examiner—Eugene S. Indyk
Attorney, Agent, or Firm—Mills & Coats

[57] ABSTRACT

The commutator or commutators of a DC motor are uniquely arranged with a plurality of peripherally spaced, current carrying segments separated by relatively large, electrically dead, non-conducting spaces, each of the dead spaces being at least as wide in a peripheral direction as the corresponding width dimension of the brushes positioned adjacent thereto. A silicon controlled rectifier (SCR) is arranged in the circuit between the negative pole of the voltage source and the commutator input terminal and acts as a switch to automatically cut off current flow therethrough each time a brush leaves a commutator segment. The current is not re-established until the SCR is again gated, which time may be varied by a variable resistor/capacitor gating circuit.

To prevent stoppage of the motor with the brushes of the commutator in a dead space a plurality of commutators are provided with the segments thereof staggered with relation to the first. Each of the additional commutators is provided with its own SCR time delay circuit for automatically cutting off and re-establishing current to the segments of the additional commutator(s).

2 Claims, 6 Drawing Figures

METHOD AND APPARATUS FOR VARYING THE SPEED OF DC MOTORS

BACKGROUND OF THE INVENTION

The speed control of DC motors has long been a problem as far as energy conservation is concerned when the motor is not operated at "full throttle", but at some varying speed from zero to full rpm. Such examples include electric automobiles or golf carts where gradual application of power and an increasing application of power would be desired as the vehicle begins to move and increase speed or if the vehicle were desired to operate at less than full speed. Further examples of variable speed, DC motor situations include high and low speed heater and air conditioner fans, electric windshield wiper motors, and many others.

In order to vary the speed of a DC motor, by far the most commonly used prior method is to place one or more resistors or a variable resistor in series with the motor and battery or other power source. The torque or speed of the motor is then varied by increasing or varying the number of these resistors or the amount of resistance in the circuit to the motor. The disadvantage of this method is readily apparent as far as wasted energy is concerned because controlling the speed in this manner means that large amounts of the power output of the battery or power source is always being pulled, regardless of the motor speed. If the motor is not operating in full capacity, the remainder of the power generated by the power source is wasted in the control or "drain" resistors in the form of heat. To further compound this situation in some cases it is even necessary to use a companion electric motor to operate a fan to blow cool air across the resistors.

Other speed control methods include rheostatic adjustment of the field current which varies the field strength, however, this also requires full voltage at all times from the power source. The Ward-Leonard system is another speed control technique which utilizes a generator to supply the motor armature and does do away with the armature rheostatic losses. However, this approach is extremely expensive as far as initial expense of added equipment is concerned.

SUMMARY OF THE PRESENT INVENTION

In the present invention, however, voltage losses through variable control resistors or rheostats are done away with in a manner which is not initially expensive. In essence, the present invention utilizes a solid state switch (silicon controlled rectifier or similar discrete device) to limit the amount of time current is conducted through the commutator to the motor, thus reducing the power input. By decreasing the amount of time current is applied, the motor may be operated at a reduced speed. The advantage here is that there is no waste of energy, since essentially all of the power from the power source is utilized to drive the motor, and none is lost in rheostats in the form of heat.

In its broadest sense the present invention then includes a commutator which has a plurality of peripherally spaced segments separated by a plurality of electrically dead spaces therebetween. The space between each successive ones of said segments is at least as great as the corresponding width dimension of the brushes against which the segments are pressed to transmit current from the power source to the armature. A time delay switching means (silicon controlled rectifier or other similar device) in the electrical circuit between the power source and the commutator limits the amount of time current is applied to the brushes while one of the commutator segments is passing thereby and in engagement therewith. As the segment leaves the brush against which it is pressed, the brush faces an electrically dead space and the current from the power source is interrupted for a period of time. Because of the unique character of the SCR, current will not again be transmitted to the next successive conductive segment, even when it engages the brush, until the SCR or similar switching means is gated, which time delay can be varied by a variable resistor/capacitor gating circuit leading to the gate of the SCR. During the time the circuit is interrupted, no appreciable voltage is drained from the power source and dissipated in the form of heat.

Since the electrically dead space between successive segments of the commutator are greater in the present invention than normally occurs in a conventional commutator, it is possible that the motor may be stopped with the brush completely in one of the electrically dead spaces. In such an instance reapplication of power would not result in a current flow because the SCR switch would not receive current, and therefore would not be activated. In a preferred embodiment, two or more tandum commutators (with their associated brushes) with the segments thereof properly staggered are used. Alternating armature windings are connected to correspondingly alternating commutator segments in such a way that there is, at any time, at least one closed circuit always available for starting.

It is therefore one object of the invention to provide an improved speed control method and apparatus for DC motors.

It is another object of the present invention to provide a method and apparatus for controlling the speed of a DC motor which is both economical to construct, and provides a considerable savings of energy during operation.

It is yet a further object of the present invention to provide a speed control method and apparatus for DC motors which delays the deliverance of current to the commutator segments of the motor wherein the amount of time of delay can be varied to control the speed thereof.

Other objects and a fuller understanding of the invention will become apparent upon reading the following detailed description of a preferred embodiment in view of the accompanying drawings in which.

Figure 4:
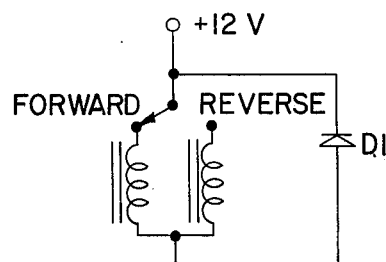
Figure 4:
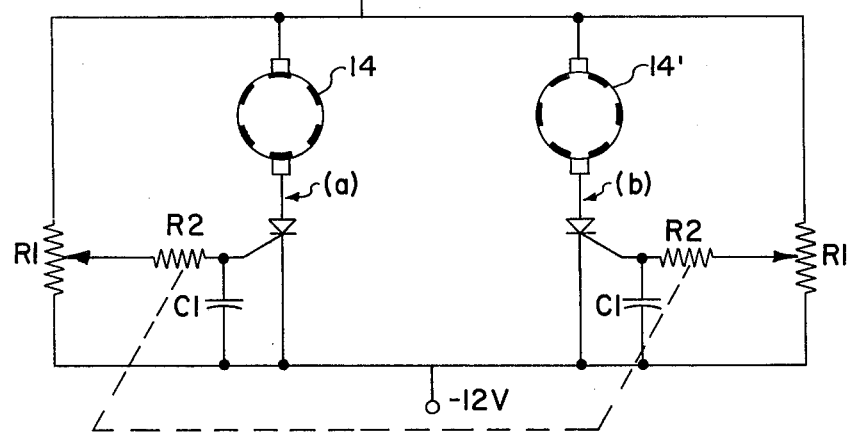
Figure 5A:
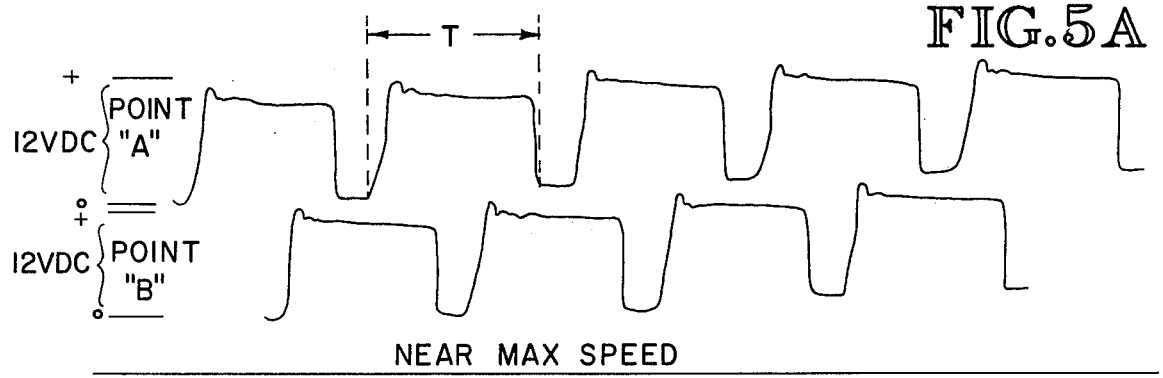
Figure 5B:
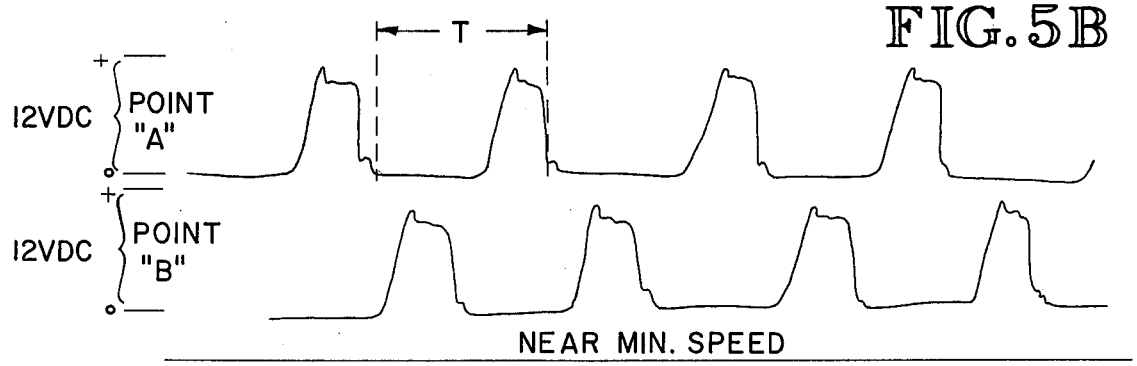

FIG. 4 is an electrical schematic representing a preferred type of circuit using two commutators; and FIGS. 5a and 5b are a pair of graphic representations of an oscilloscope trace of points A and B of the schematic in FIG. 4 with 5a representing near maximum speed and 5b representing near minimum speed.

DETAILED DESCRIPTION OF A PREFERRED EMBODIMENT

Turning now to a discussion of a preferred embodiment of the invention, in the usual DC electric motor, there is a constant flow of electric current through the field, brushes, commutator and armature. This DC current flow is uninterrupted because the conventional commutator segments are so arranged that as one segment is leaving a brush, another is arriving. The brush width is greater than the space between segments and therefore a portion of the brush is always in contact with one segment or the next or at times both. This sequence continues at all times as the armature rotates. In accordance with the present invention, the general concept is to interrupt the continuous flow of current constantly so that an SCR or other electronic switching device in the circuit is turned off as each segment of the commutator leaves a brush. Then, even though the circuit is re-established when the next conducting segment engages the brush, current does not flow until the switching device is activated or "gated". The time of such gating may be varied to control the power to the motor and thus the speed thereof.

Figure 1:
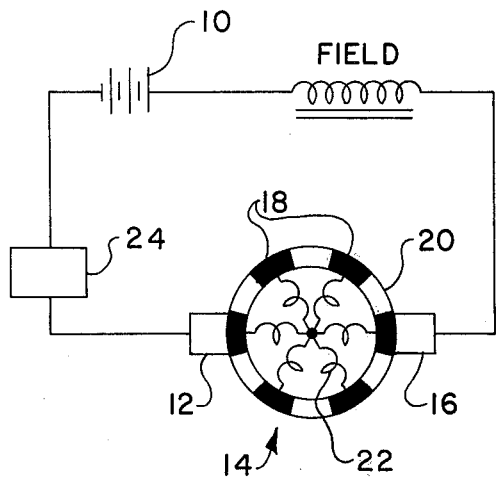
FIG. 1 is a simple schematic representation of the circuit to the commutator and the unique arrangement of the commutator segments with respect to the brushes.

Turning now to FIG. 1 there is illustrated in its simplest form a schematic representation of the concept of the present invention. Current from a power souce or battery 10 is delivered to a first brush 12 adjacent one side of a commutator 14. The circuit is completed by means of a pickup brush 16 which picks up the current on the other side of the commutator 14 and delivers it back to battery 10. As illustrated in FIG. 1 the first aspect of the present invention involves changing of the spacing in the commutator 14 so that there are provided a plurality of peripherally spaced conducting segments 18 separated by a plurality of electrically dead spaces 20 therebetween. The space 20 between each successive ones of the segments 18 is at least as great as the corresponding width dimension of brushes 12 and 16, so that during rotation when brush 12 or 16 leaves one conducting segment 18 there is sufficient space between that segment and the successive segment that there is a short period of time during which the circuit is broken. It should be noted that the conducting segments 18 are each wired into the armature by means of conducting wires 22.

The other aspect of the invention, in its broadest sense, lies in the use of switching means 24, such as for example, a gated SCR which will be described hereinafter in more detail in connection with the description of FIG. 4. However, at this point it is sufficient to note that the SCR in the switching circuit 24 will turn off each time a conducting segment 18 of commutator 14 leaves a brush 12, 16. Thereafter the SCR will not be turned on again until reactivated or "gated" by the gating circuit, which time can be varied to control the speed of the motor.

Figure 2:
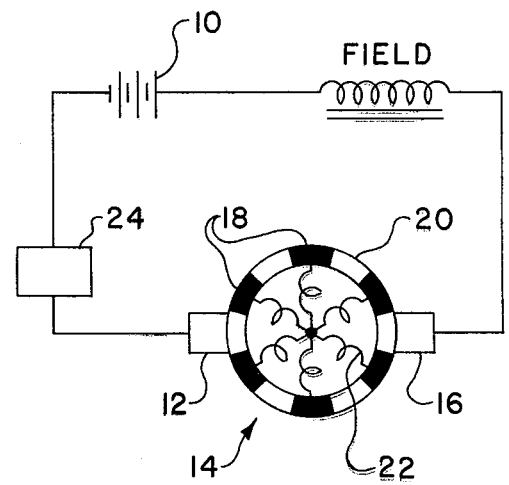
FIG. 2 is a simple schematic representation similar to FIG. 1 except showing how a problem may arise in view of the wide spacing between adjacent commutator segments.
Figure 3:
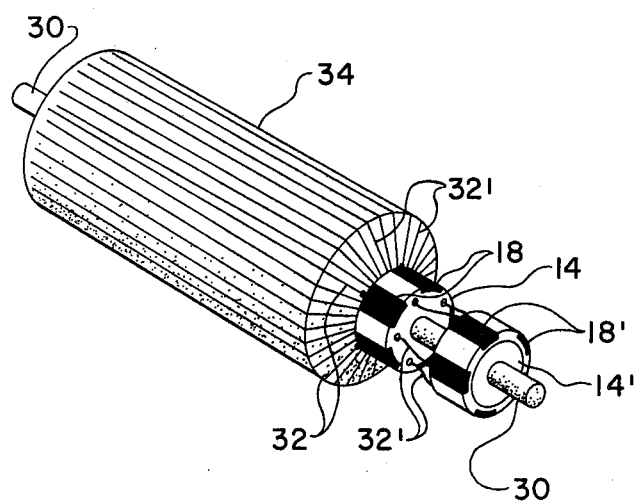
FIG. 3 is a perspective diagrammatic representation of a motor armature and a pair of commutators connected thereto which solves the problem appearing in FIG. 2.

Since the electrically dead spaces 20 between successive segments 18 of commutator 14 are at least as wide as the corresponding dimension of brushes 12, 16, once the motor is allowed to completely stop there is a chance of it stopping exactly in such a position that the brushes are not in contact with any portion of any conducting segment 18 (FIG. 2). In this situation, reapplication of power will not result in a current flow and therefore the motor will not restart. In order to obviate this possibility two or more tandum commutators 14,14' are arranged on the motor shaft 30 with the conducting segments 18,18' thereof properly staggered in such a way that, upon motor stoppage, one or the other commutators will be stopped with the brushes thereof in contact with the conducting segments. Alternately, the brush positions on commutators 14,14' could be staggered with the same result. Thus at least one closed circuit will be available for restarting. In construction, according to a preferred embodiment the two or more commutators 14,14' are placed on the motor shaft 30 adjacent each other, and alternate windings 32 are of the rotor 34 connected to the conductive segments 18 commutator 14. The other windings 32' pass through commutator 14 and connect to the conductive segments 18' commutator 14' as illustrated in FIG. 3. A wire tap at the proper point (see FIG. 4) provides the interrupted DC current flow to gate the SCRs.

It should be noted at this point that although the description has made reference to commutators having electrically conducting segments 18 and relatively large non-conducting spaces 20 therebetween, it should be apparent that conventional commutators might be utilized which have relatively narrow spaces between each segment, if alternating segments were electrically dead, i.e., not connected to the armature field windings. In this way special commutators would not have to be manufactured thus resulting in less expensive conversions of existing motors to this type of control circuit.

FIG. 4 is illustrative of a circuit having two commutators 14, 14' with the segments thereof staggered as illustrated in FIG. 3. The schematic of FIG. 4 is representative of a circuit which is suitable for a 0.1 horsepower motor in a 12-volt circuit. The 5 amp SCR is gated by means of a 30 mfd capacitor C1 in parallel with a rheostat or variable resistor R1 which picks off a desired resistance from a one-quarter watt, 1500 omh resistor. The 220 omh resistor R2 provides protection for the SCR so that there will always be some resistance to prevent shock thereof. The 1.0 amp diode D1 protects the entire circuit from inductive kick-back from the forward and reverse field coils F, R. FIG. 5 shows oscilloscope traces of voltages appearing at points A and B on the schematic in FIG. 4. The upper tracing is at near maximum rpm and the lower tracing at near minimum rpm. Additionally, as shown in FIGS. 5A and 5B, T=time during which current carrying segment is in contact with brush.

Although the silicon controlled rectifier is utilized as the preferred solid state electronic switch it should be apparent that other discrete electronic switching devices, which may be interrupted and then reactivated according to a delayed time pattern, might be utilized in the same manner. The important thing is that the present method and apparatus utilize a voltage interruption type approach to control the speed of the DC motor, rather than the conventional "drain resistors" which are a complete waste of energy.

While a preferred embodiment has been described in detail hereinabove, it is apparent that other changes and modifications might be made without departing from the scope of the present invention, which is set forth in the following claims.

What is claimed is:

1. An electrical device comprising: a speed control for a DC electric motor of the type having an armature with the rotor windings thereof electrically connected to a commutator, a set of brushes for applying current to the commutator segments, and the entire motor powered by a source of DC voltage; a plurality of peripherally spaced, electrically conducting commutator segments separated by a plurality of electrically dead spaces therebetween, the space between each successive ones of said segments being at least as great as the corresponding width dimension of one of said brushes whereby as a conducting segment leaves a brush, current is interrupted; electronic switching means of the silicon controlled rectifier type in the electrical circuit between said source and said commutator for maintaining said current interruption from the DC voltage source to the brushes until reactivation of said switching means; and variable gating means in the form of a variable resistor and capacitor in parallel with each other positioned in the circuit between said source of DC voltage and the cathode of said silicon controlled rectifier for reactivating said electronic switching means after a preset time delay whereby the speed of said DC electric motor may be varied without a constant drain of power from the source of DC voltage.

2. The improvement according to claim 1 and further including at least one additional commutator with associated switching means and gating means substantially identical to the first commutator and associated switching means and gating means, said additional commutator arranged adjacent the first commutator and axially aligned thereto with the electrically conductive segment thereof peripherally staggered from the corresponding segments of the first commutator, whereby said motor cannot be stopped with the brushes adjacent an electrically dead space.

* * * * *